(12) United States Patent
Norris et al.

(10) Patent No.: US 8,992,168 B2
(45) Date of Patent: Mar. 31, 2015

(54) ROTATING VANE SEAL WITH COOLING AIR PASSAGES

(75) Inventors: James W. Norris, Lebanon, CT (US); Joseph W. Bridges, Jr., Durham, CT (US)

(73) Assignee: United Technologies Corporation, Hartford, CT (US)

( * ) Notice: Subject to any disclaimer, the term of this patent is extended or adjusted under 35 U.S.C. 154(b) by 664 days.

(21) Appl. No.: 13/283,782

(22) Filed: Oct. 28, 2011

(65) Prior Publication Data

US 2013/0108425 A1 May 2, 2013

(51) Int. Cl.
*F01D 11/02* (2006.01)
*F01D 11/00* (2006.01)

(52) U.S. Cl.
CPC .................................. *F01D 11/005* (2013.01)
USPC ........................ 415/173.7; 415/199.5; 416/174

(58) Field of Classification Search
CPC ........... F01D 5/06; F01D 5/30; F01D 11/005; F01D 11/008
USPC ..................... 415/173.7, 174.4, 199.5, 211.2; 416/174, 193 A
See application file for complete search history.

(56) References Cited

U.S. PATENT DOCUMENTS

| | | | | |
|---|---|---|---|---|
| 2,858,101 | A * | 10/1958 | Alford | 416/97 R |
| 3,094,309 | A * | 6/1963 | Hull, Jr. et al. | 416/201 R |
| 4,035,102 | A * | 7/1977 | Maghon | 416/95 |
| 4,526,508 | A | 7/1985 | Antonellis et al. | |
| 4,529,452 | A | 7/1985 | Walker | |
| 4,582,467 | A | 4/1986 | Kisling | |
| 4,759,688 | A * | 7/1988 | Wright et al. | 416/95 |
| 4,792,277 | A | 12/1988 | Dittberner, Jr. et al. | |
| 4,884,950 | A | 12/1989 | Brodell et al. | |
| 5,308,227 | A * | 5/1994 | Gros et al. | 416/219 R |
| 5,344,283 | A | 9/1994 | Magowan et al. | |
| 5,374,161 | A * | 12/1994 | Kelch et al. | 415/139 |
| 5,562,404 | A | 10/1996 | Koff et al. | |
| 5,593,274 | A | 1/1997 | Carreno et al. | |
| 6,071,075 | A * | 6/2000 | Tomita et al. | 416/97 R |
| 6,220,012 | B1 | 4/2001 | Hauser et al. | |
| 6,540,477 | B2 | 4/2003 | Glynn et al. | |
| 6,655,920 | B2 | 12/2003 | Beutin et al. | |
| 7,028,486 | B2 * | 4/2006 | Marushima et al. | 60/806 |
| 7,028,487 | B2 * | 4/2006 | Marushima et al. | 60/806 |
| 7,431,564 | B2 | 10/2008 | Newman | |
| 7,488,153 | B2 * | 2/2009 | Reigl | 415/177 |
| 7,832,986 | B2 | 11/2010 | Baker et al. | |
| 7,931,442 | B1 | 4/2011 | Liang | |
| 8,376,689 | B2 * | 2/2013 | Bhagavatheeswaran et al. | 415/115 |
| 2008/0310955 | A1 | 12/2008 | Norris et al. | |
| 2012/0003079 | A1 * | 1/2012 | Farrell et al. | 415/173.6 |
| 2013/0108425 | A1 * | 5/2013 | Norris et al. | 415/191 |

FOREIGN PATENT DOCUMENTS

| | | | |
|---|---|---|---|
| DE | 2027861 | A1 * | 12/1971 |
| DE | 19940556 | A1 * | 3/2001 |
| GB | 2272946 | A * | 6/1994 |

* cited by examiner

*Primary Examiner* — Edward Look
*Assistant Examiner* — Christopher R Legendre
(74) *Attorney, Agent, or Firm* — Carlson, Gaskey & Olds, PC

(57) ABSTRACT

An inner diameter vane seal for a gas turbine engine comprises an annular, ring-like body having inner and outer diameter rims, forward and aft faces and an air passage. The outer diameter rim extends circumferentially for engaging inner diameter ends of stator vanes. The inner diameter rim extends circumferentially and is spaced radially from the inner outer diameter rim. The forward and aft faces extend radially between the outer diameter rim and the inner diameter rim. The air passage extends from the forward face to the aft face between the inner and outer diameter rims.

25 Claims, 5 Drawing Sheets

US 8,992,168 B2

ROTATING VANE SEAL WITH COOLING AIR PASSAGES

BACKGROUND

Gas turbine engines operate by passing a volume of high energy gases through a plurality of stages of vanes and blades, each having an airfoil, in order to drive turbines to produce rotational shaft power. The shaft power is used to drive a compressor to provide compressed air to a combustion process to generate the high energy gases that ultimately provide thrust. Additionally, the shaft power can be used to drive a generator for producing electricity. In order to produce gases having sufficient energy to drive the compressor or generator, it is necessary to combust the fuel at elevated temperatures and to compress the air to elevated pressures, which again increases the temperature. Thus, the vanes and blades are subjected to extremely high temperatures, often times exceeding the melting point of the alloys comprising the airfoils.

In order to maintain the airfoils at temperatures below their melting point, it is necessary to, among other things, cool the airfoils with a supply of relatively cooler air typically bled from the compressor. In particular, relatively cool air from the compressor is used to cool hotter components in the turbine system. Typically, the compressor air is taken from the discharge section of the compressor so that the air is sufficiently pressurized to route to other locations in the engine. The compressor air can be directly routed to hot components such as the turbine, as is known in the art. Alternatively, the compressor air can be routed to a heat exchange system that further cools the compressor air, as is shown in U.S. Pub. No. 2002/0310955 to Norris et al., which is assigned to United Technologies Corp. In high performance engines, for example, the compressor vanes and blades themselves sometimes need to be cooled with the cooled compressor air because high engine operating pressure ratios increase the discharge temperature of the compressor.

The cooled compressor air can be routed to hot components by passing the air through the engine casing, radially outward of the primary gas path, until it reaches the desirable axial position within the engine. Sometimes it is desirable to route the air radially inward of the primary gas path, through the rotating components of the engine. For example, after being cooled by the heat exchange system, the cooled compressor air is sometimes routed through the engine to cool the interface between airfoils and the rotors to which they are mounted, as shown in U.S. Pat. No. 6,655,920 to Beutin et al. Rotation of the cooling air caused by rotation of the engine components, however, induces thermal losses into the cooling system, thereby reducing the overall engine efficiency. There is, therefore, a need for reducing efficiency losses in gas turbine engine air cooling systems.

SUMMARY

The present invention is directed toward an inner diameter vane seal for a gas turbine engine. The inner diameter vane seal comprises an annular, ring-like body having inner and outer diameter rims, forward and aft faces and an air passage. The outer diameter rim extends circumferentially for engaging inner diameter ends of stator vanes. The inner diameter rim extends circumferentially and is spaced radially from the inner outer diameter rim. The forward and aft faces extend radially between the outer diameter rim and the inner diameter rim. The air passage extends from the forward face to the aft face between the inner and outer diameter rims.

DETAILED DESCRIPTION

Figure 1:
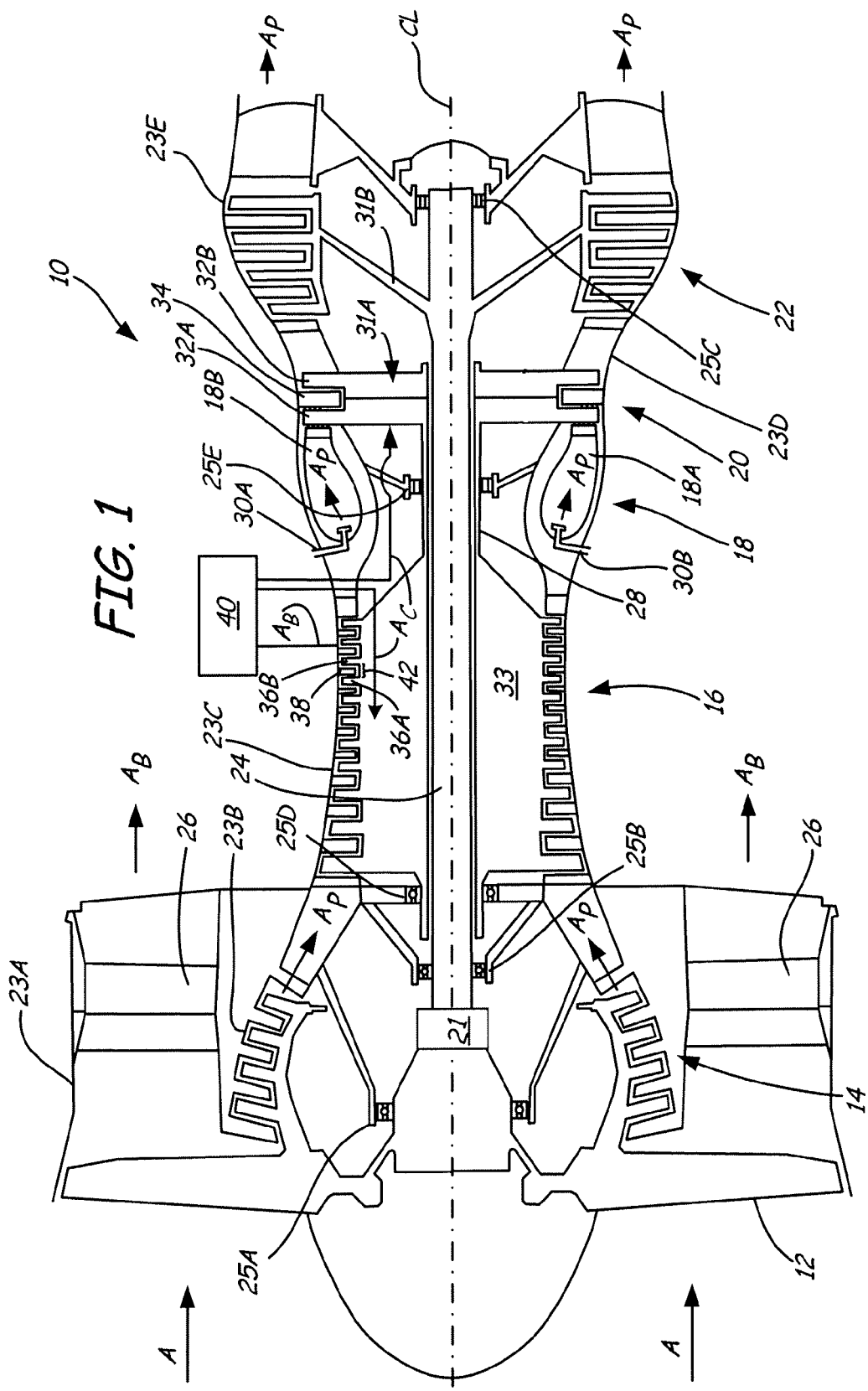
FIG. 1 is a diagrammatic view of a gas turbine engine including a high pressure compressor section having a rotating inner diameter vane seal ring of the present invention.

FIG. 1 shows gas turbine engine 10, in which a rotating vane seal ring with cooling air passages of the present invention can be used. Gas turbine engine 10 comprises a dual-spool turbofan engine having fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E, such that an air flow path is formed around centerline CL. Although depicted as a dual-spool turbofan engine in the disclosed non-limiting embodiment, it should be understood that the concepts described herein are not limited to use with turbofans as the teachings may be applied to other types of turbine engines, such as three-spool turbine engines and fan drive gear systems.

Inlet air A enters engine 10 and is divided into streams of primary air $A_P$ and bypass air $A_B$ after it passes through fan 12. Fan 12 is rotated by low pressure turbine 22 through shaft 24, directly or via a transmission or gear box 21, to accelerate bypass air $A_B$ through exit guide vanes 26, thereby producing a major portion of the thrust output of engine 10. Shaft 24 is supported within engine 10 at ball bearing 25A, roller bearing 25B and roller bearing 25C. Primary air $A_P$ (also known as gas path air) is directed first into low pressure compressor (LPC) 14 and then into high pressure compressor (HPC) 16. LPC 14 and HPC 16 work together to incrementally step up the pressure of primary air $A_P$. HPC 16 is rotated by HPT 20 through shaft 28 to provide compressed air to combustor section 18. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22. Primary air $A_P$ continues through gas turbine engine 10 whereby it is typically passed through an exhaust nozzle to further produce thrust.

HPT 20 and LPT 22 each include a circumferential array of blades extending radially from rotors 31A and 31B, which are connected to shafts 28 and 24, respectively. Similarly, HPT 20 and LPT 22 each include a circumferential array of vanes extending radially from HPT case 23D and LPT case 23E, respectively. For example, HPT 20 comprises a two-stage turbine having blades 32A and 32B extending radially outward from rotor 31A, and vane 34 extending radially inward from HPT case 23E between blades 32A and 32B. Similarly, HPC 16 includes blades 36A and 36B that extend radially outward from disks of rotor 33, and vane 38 extends radially inward from HPC case 23C between blades 36A and 36B. HPC 16 provides compressed bleed air $A_B$ to heat exchange system 40, which cools the air using any suitable heat exchange medium, such as air, fuel, oil or a coolant. Other varieties of cooling systems may also be used in other embodiments. System 40 may be provided with a boost pump to increase the pressure of cooling air $A_C$. Blades 32A and 32B and blades 36A and 36B include internal passages into which compressed cooling air $A_C$ from system 40 is directed to provide cooling relative to the hot combustion gasses of primary air $A_P$. Likewise, cooling air $A_C$ is directed into vanes 34 and 38. In the present invention, HPC 16 includes an axially extending path through which cooling air $A_C$ is routed to cool the interface regions between blades 36A and 36B and rotor 33. Specifically, rotating inner diameter vane seal ring 42 is positioned axially between adjacent disks of rotor 33. In other embodiments of the invention, a rotating inner diameter vane seal ring may be provided between adjacent rotors in LPC 14, HPT 20 or LPT 22.

Figure 2:
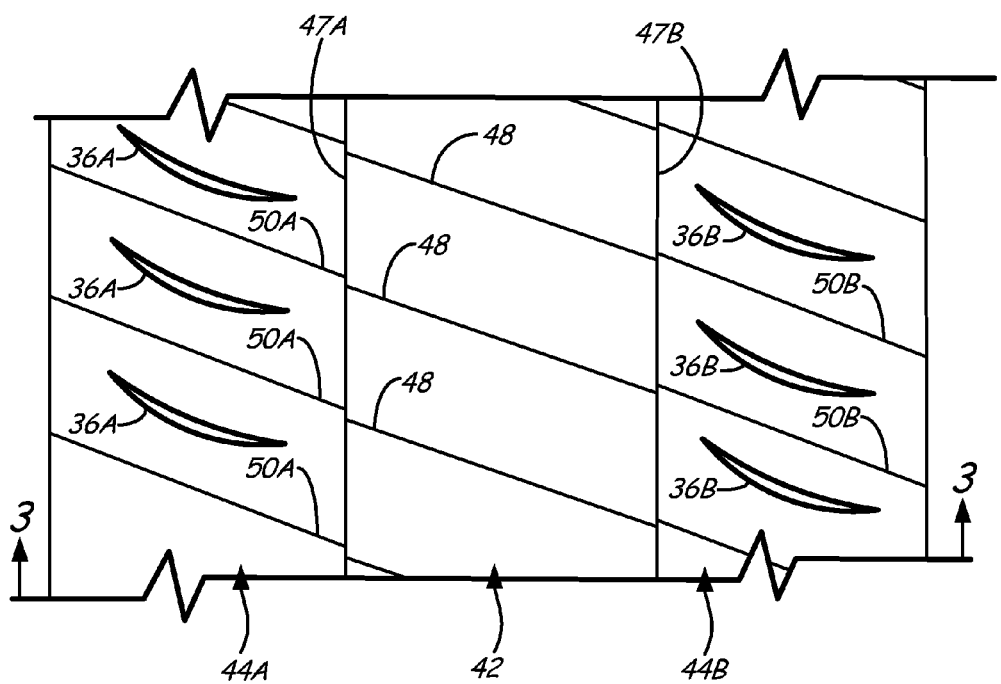
FIG. 2 is a top schematic view of the high pressure compressor section of FIG. 1 showing the rotating inner diameter vane seal ring positioned between adjacent rotor disk rims.

FIG. 2 is a top schematic view of high pressure compressor section 16 of FIG. 1 showing rotating inner diameter vane seal ring 42 positioned between adjacent rotor disks 44A and 44B. A plurality of blades 36A extend radially outward from disk 44A. Likewise, a plurality of blades 36B extend radially outward from disk 44B. Blades 36A and 36B extend integrally from disks 44A and 44B. A plurality of vanes 38 extend radially inward from compressor case 23C (FIG. 1). The inner diameter ends of vanes 38 come close to or contact inner diameter vane seal ring 42. The present invention is described with reference to using seal ring 42 within a compressor section. However, seal ring 42 may also be used in turbine sections of gas turbine engines, as mentioned, in a similar configuration as shown in FIG. 2.

When compressor section 16 rotates, disks 46A and 46B and blades 36A and 36B rotate about the engine centerline CL, upward with respect to FIG. 2, which pushes primary air $A_P$ in the downstream direction, rightward with respect to FIG. 2. Inner diameter vane seal ring 42 is attached to disks 44A and 44B at forward face 47A and aft face 47B such that ring 42 rotates with blades 36A and 36B. Inner diameter seal ring 42 seals the airflow as it flows past vanes 38. Thus, disks 44A and 44B and ring 42 form a continuous rotating annular body. A plurality of continuous passages for the flow of cooling air $A_C$ is provided through disks 44A and 44B and ring 42. The passages include slots to provide stress relief, as will be discussed in greater detail with reference to FIG. 4. For example, ring 42 includes slots 48, while disks 44A and 44B include slots 50A and 50B.

Figure 4:
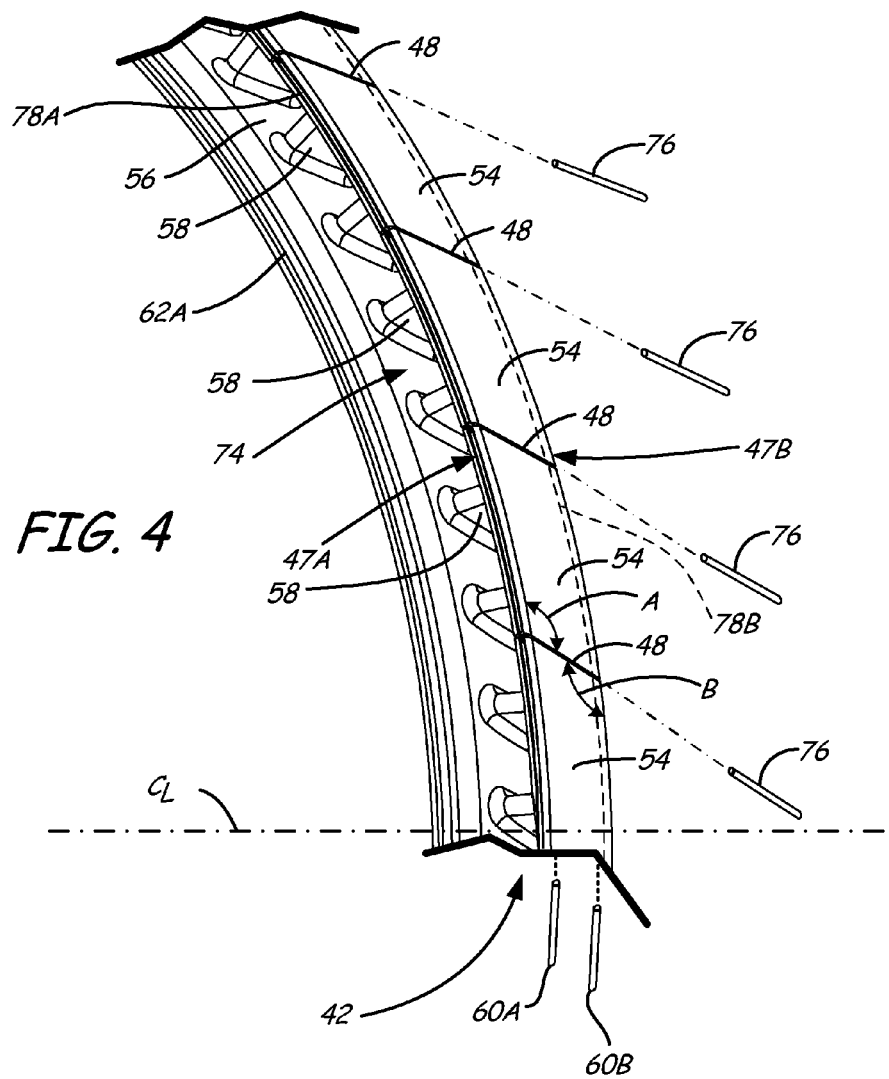
FIG. 4 is a partial exploded perspective view of the rotating inner diameter vane seal ring of FIG. 3 showing an array of flow passages each having a stress relief slot and a seal.

The passages are angled in the circumferential direction relative to engine centerline CL. Specifically, the passages are angled to accommodate the position of blades 36A and blades 36B on disks 44A and 44B, respectively. For example, blades 36A and 36B are angled in order to produce the desired compression effect on primary air $A_P$ (FIG. 1) when rotated. It is desirable to provide blades 36A and 36B with firm support from disks 44A and 44B, respectively. As such, the cooling passages are positioned circumferentially between blades 36A and 36B. With reference to FIG. 2, each of slots 48, 50A and 50B are approximately centered over one of the cooling air passages. As shown in FIG. 4, one slot 48 is provided for two cooling air passages to provide strength to the segments of ring 42. Because disk 44A, ring 42 and disk 44B rotate in unison, air flowing through the components does not experience dynamic losses from having to pass through alternating rotating and non-rotating components.

Figure 3:
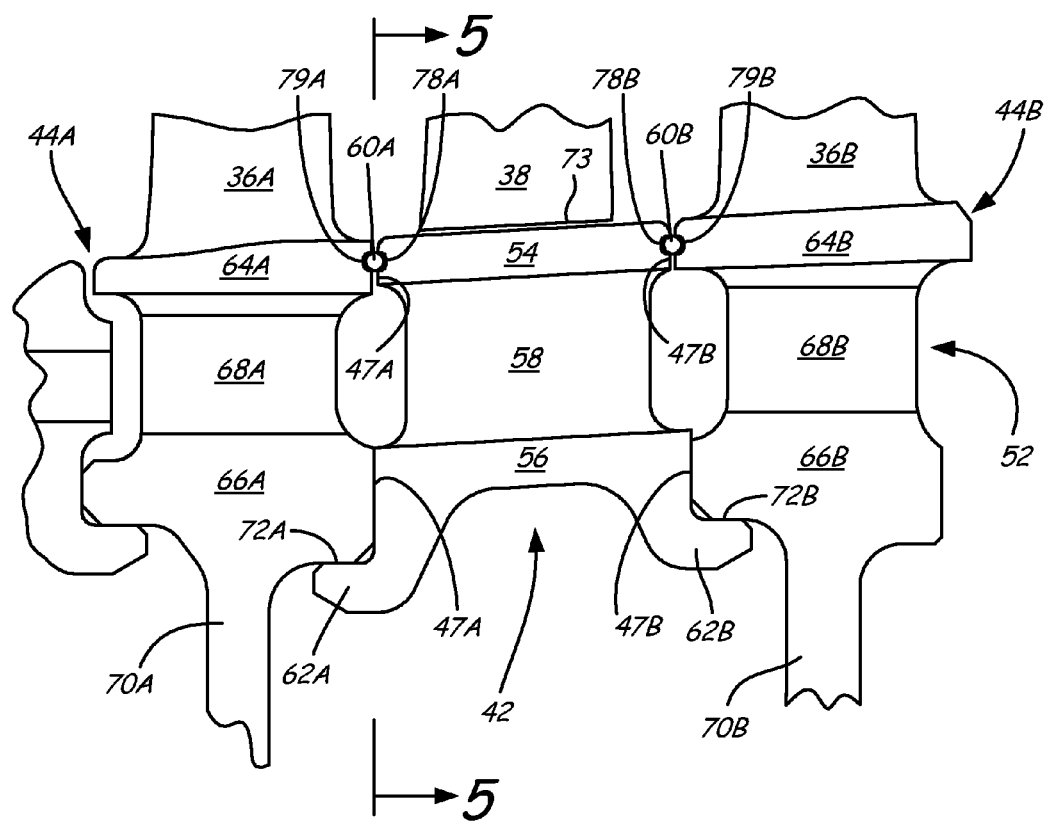
FIG. 3 is a side cross-sectional view of the high pressure compressor section as taken at section 3-3 of FIG. 2 showing an inner diameter flow path extending through the inner diameter vane seal ring and the rotor disk rims.

FIG. 3 is a side cross-sectional view of high pressure compressor section 16 as taken at section 3-3 of FIG. 2 showing inner diameter flow path 52 extending through inner diameter vane seal ring 42 and rotor disks 44A and 44B. Seal ring 42 includes forward face 47A, aft face 47B, outer diameter rim 54, inner diameter rim 56, sidewall 58, wire seals 60A and 60B, forward hook 62A, aft hook 62B, forward seal slot 78A and aft seal slot 78B. Forward rotor disk 44A includes outer diameter rim 64A, inner diameter rim 66A, sidewall 68A, rotor 70A, shoulder 72A and seal slot 79A. Likewise, aft rotor disk 44B includes outer diameter rim 64B, inner diameter rim 66B, sidewall 68B, rotor 70B, shoulder 72B and seal slot 79B.

Stator vane 38 is cantilevered from compressor case 23C (FIG. 1) of engine 10 so that inner diameter tip 73 is adjacent the outer diameter surface of rim 54 of ring 42. Thus, tips 73 of the plurality of stator vanes 38 comprising HPC 16 are unsecured and free to engage ring 42. However, a small gap is provided between tip 73 and ring 42 to allow for flexure and expansion of the components. In one embodiment of the invention, rim 54 is provided with abradable material (See FIG. 5), such as honeycomb, and tip 73 may be provided with a mating knife edge to form a seal that permits contact between the components. Stator vane 38 does not rotate within engine 10. However, stator vane 38 is surrounded on its remaining three sides (as shown in FIG. 3) by rotating components of HPC 16. Ring 42 is typically used between adjacent rotors having internal passages, but could be used aft of a rear stage rotor so that a rotor is provided only upstream of ring 42.

Rotor disks 44A and 44B are mounted to shaft 28 within engine 10 (FIG. 1) so as to rotate about engine centerline CL. Rotor disks 44A and 44B thus include central bores through which shaft 28 extends. Rotors 70A and 70B are coupled to shaft 28 using any suitable method. For example, rotors 70A and 70B, as well as other rotors, may be fastened to each other to form rotor 33 (FIG. 1) and mounted to the shaft at axially forward and aft ends through rotor couplings. Inner diameter rims 66A and 66B form a portion of the inner diameter flow area of flow path 52. Rims 66A and 66B also include shoulders 72A and 72B for mounting of ring 42. Outer diameter rims 64A and 64B form a portion of the outer diameter flow area of flow path 52. Side walls 68A and 68B connect the inner and outer diameter rims so that flow path 52 is divided into a plurality of circumferential slots.

Turbine blades 36A and 36B comprise airfoils that extend radially outward from rims 64A and 64B. In the disclosed embodiment, disks 44A and 44B comprise integrated bladed rotor disks (or blisks), wherein blades 36A and 36B are integrally formed, such as by casting, with rims 64A and 64B, rims 66A and 66B and rotors 70A and 70B, respectively. In other embodiments, however, rotors 70A and 70B may comprise rotors having slots that receive airfoil roots of blades 36A and 36B, with flow path 52 extending between rotors 70A and 70B and the slots. Rotors 70A and 70B rotate, causing the portions of flow path 52 within disks 44A and 44B to also rotate.

Ring 42 is mounted to rims 66A and 66B so as to rotate with disks 44A and 44B. Forward face 47A abuts rim 64A and aft face 47B abuts rim 64B. Hooks 62A and 62B engage shoulders 72A and 72B of rims 66A and 66B, respectively, to properly position ring 42. Positioned as such, inner diameter rim 56 of ring 42 is axially between rims 66A and 66B. Likewise, outer diameter rim 54 is between rims 64A and 64B. As such, flow path 52 extends continuously through disks 44A and 44B and ring 42. Rims 54 and 56 are held in compression between disks 44A and 44B when rotors 70A and 70B are secured to each other, such as with threaded fasteners. Outer diameter rim 54 is sealed with wire seals 60A and 60B to prevent flow of cooling air out of flow path 52 and into the hot gas path. Wire seal 60A is disposed between seal slot 79A of rim 64A and seal slot 78A of rim 54. Wire seal 60B is disposed between seal slot 79B of rim 64B and seal slot 78B of rim 54. Inner diameter rim 56 is sealed by abutment with rims 66A and 66B. Hooks 62A and 62B prevent radial displacement of rim 42 with respect to disks 44A and 44B so as to prevent contact with vane 38. Sidewalls 58 connect rims 54 and 56 to form a plurality of circumferential slots, as shown in FIG. 4.

FIG. 4 is a partial exploded perspective view of rotating inner diameter vane seal ring 42 of FIG. 3 showing an array of flow passages 74 each having stress relief slot 48 and seal 76. Rotating inner diameter vane seal ring 42 also includes outer diameter rim 54, inner diameter rim 56, sidewalls 58, wire seals 60A and 60B, forward hook 62A, wire seals 76, forward seal slot 78A and aft seal slot 78B. FIG. 4 shows only a portion of ring 42, which forms a full three-hundred-sixty degree ring. Inner diameter rim 56 is a full ring extending through the entire circumference of ring 42. Outer diameter rim 54 includes a plurality of slots 48 such that it is not continuous through the entirety of the circumference of ring 42. However, seals 76 fill in the space between adjacent segments of rim 54 such that a continuous body is formed to provide an air seal. In the embodiment shown, seals 76 comprise wire seals, as are known in the art. In other embodiments, feather seals may be used.

The segments of outer diameter rim 54 are individually jointed to inner diameter rim 56 through sidewalls 58 to form flow passages 74. Thus, each flow passage 74 comprises a portion of inner diameter rim 56, portions of adjacent sidewalls 58, and a segment of outer diameter rim 54. Outer diameter rim 54 includes forward seal slot 78A for receiving forward wire seal 60A (FIG. 3). Seal slot 78A comprises a channel or semi-circular groove for receiving seal 60A. Outer diameter rim 54 includes seal slot 78B (shown in phantom) for receiving wire seal 60B (See FIG. 3).

Slots 48 and flow passages 74 are angled with respect to engine centerline CL. FIG. 4 shows a front view of ring 42 rotated along a radial axis. As such, centerline CL remains horizontal. Slots 48 are, however, angled with respect to centerline CL, as is clearly shown in FIG. 2. In other words, slot 48 forms angles A and B with forward face 47A and aft face 47B, respectively. Angles A and B are not ninety degrees. In the embodiment shown, angles A and B are approximately eighty degrees. Passages 74 are angled to align with passages within disks 44A and 44B. As discussed with reference to FIG. 2, the passages are angled to avoid being positioned beneath blades 36A and 36B.

Figure 5:
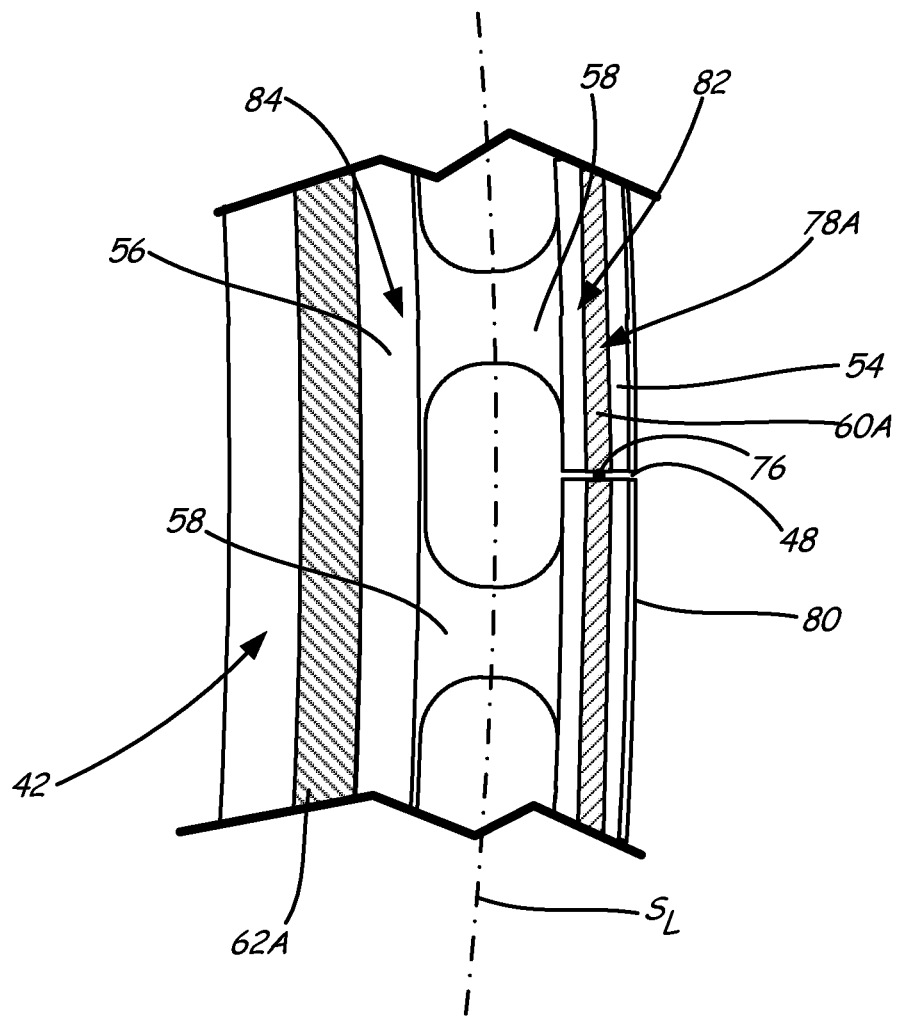
FIG. 5 is a front cross-sectional view of the rotating inner diameter vane seal ring as taken at section 5-5 of FIG. 3 showing inner and outer diameter rims joined at a split line.

FIG. 5 is a front cross-sectional view of rotating inner diameter vane seal ring 42 as taken at section 5-5 of FIG. 3, showing inner 56 and outer 54 diameter rims 54 and 56 joined at split line SL. Ring 42 includes forward face 47A, aft face 47B, outer diameter rim 54, inner diameter rim 56, sidewall 58, slot 48, forward seal slot 78A, aft seal slot 78B, and abradable layer 80. Rim 54 is joined to rim 56 via a plurality of sidewalls 58. Outer diameter rim 54 is exposed to hot primary air AP (FIG. 1) at its outer surface and cooling air AC (FIG. 1) at its inner surface, while inner diameter rim 56 is only exposed to cooling air AC at its outer diameter surface. The difference in temperature between primary air AP and cooling air AC is significant. Components exposed to primary air AP must be comprised of high temperature alloys, such as those typically used in turbine sections. These alloys are expensive, such that it is desirable to avoid their use other than where needed. Components exposed only to cooling air AC are comprised of lower temperature alloys, such as those typically used in compressor sections.

Outer diameter rim 54 can be fabricated from a high temperature alloy, while inner diameter rim 56 can be fabricated from a lower temperature alloy. Both alloys are typically a high performance nickel alloy, as are known in the art. Sidewall 58 can, in various embodiments, be comprised of a high temperature alloy, a lower temperature alloy or a different alloy. In the embodiment shown, however, sidewall 58 is provided with split line SL such that upper portion 82 is comprised of the same material as outer diameter rim 54 and lower portion 84 is comprised of the same material as inner diameter rim 56. As such, only upper and lower halves of rim 42 need be fabricated separately and joined at split line SL, such as with a welding or brazing process. Slots 48 can, for example, be machined into outer diameter rim 54 after assembly with inner diameter rim 56. Slots 48 eliminate thermal metal fatigue in outer diameter rim 54. For example, cracks have a propensity to form in outer diameter rim 54 as engine 10 cycles between hot and cold temperatures. Slots 48 interrupt the cracks to prevent spreading through out ring 42. Abradable layer 80 can be added before or after machining of slots 48 so as to provide a wear surface that degrades in a controlled manner if engagement with stator 38 occurs.

The present invention provides improved performance in compressor and turbine sections in gas turbine engines. For example, in high performance engines having high pressure ratios, compressor temperatures reach elevated ranges that require cooling. The rotating inner diameter vane seal of the present invention permits cooling air to be routed into the compressor to cool various components, such as the compressor blades and vanes. The ring provides a rotating flow path that continuously connects to flow paths in adjacent rotating turbine rotors. Cooling air travelling through the flow paths is thus able to uninterruptedly rotate as it travels through the compressor. Dynamic losses in the cooling air are avoided because the entire flow path rotates. For example, cooling air accumulates windage losses when passing from a rotating passage to a non-rotating passage. Each successive transition from rotation to non-rotation adds heat to the cooling air, reducing cooling effectiveness. These inefficiencies result in high part temperatures, among other things. The rotating inner diameter vane seal includes rotating passages to avoid windage and other losses, thereby improving overall engine efficiency.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A blade and vane assembly for a gas turbine engine, the assembly comprising:
   an annular casing;
   a forward bladed rotor assembly configured to rotate within the annular casing about an engine centerline;
   an aft bladed rotor assembly configured to rotate within the annular casing;
   a plurality of stator vanes cantilevered from the annular casing so as to remain stationarily disposed between the forward and aft bladed rotor assemblies; and
   a sealing ring coupled to the forward and aft bladed rotor assemblies so as to be rotatable with the bladed rotor assemblies, the sealing ring comprising:
   an outer diameter rim for engaging inner diameter ends of the plurality of stator vanes;
   an inner diameter rim spaced radially from the outer diameter rim;
   a forward face for engaging with the forward rotor assembly;
   an aft face for engaging with the aft rotor assembly;
   an air passage extending from the forward face to the aft face between the inner and outer diameter rims; and
   sidewalls connecting the inner diameter rim to the outer diameter rim to define a plurality of air passages that are angled relative to the engine centerline.

2. The blade and vane assembly of claim 1 wherein the outer diameter rim includes a plurality of slots extending from the forward face to the aft face.

3. The blade and vane assembly of claim 2 wherein the slots and the individual air passages are angled with respect to the sidewalls.

4. The blade and vane assembly of claim 3 wherein each slot includes a wire seal.

5. The blade and vane assembly of claim 1 wherein the outer diameter rim and the inner diameter rim comprise different materials.

6. The blade and vane assembly of claim 5 wherein the plurality of sidewalls include a split line where the different materials of the outer diameter rim and the inner diameter rim are joined.

7. The blade and vane assembly of claim 1 wherein the outer diameter rim includes an abradable material.

8. The blade and vane assembly of claim 1 wherein the outer diameter rim includes:
   a forward seal slot extending around a circumference of the annular ring-like body; and
   an aft seal slot extending around a circumference of the annular ring-like body.

9. The blade and vane assembly of claim 1 wherein the inner diameter rim includes forward and aft hooks for engaging the forward and aft rotors.

10. The blade and vane assembly of claim 1 wherein the forward and aft rotors comprise turbine assemblies comprising:
    a rotor disk having an outer diameter rim;
    a plurality of blades extending radially from the outer diameter rim; and
    a plurality of passages extending radially inward of the outer diameter rim.

11. The blade and vane assembly of claim 10 wherein the forward and aft rotors comprise integrally bladed rotors.

12. The blade and vane assembly of claim 10 wherein the plurality of passages aligns with the plurality of individual air passages in the sealing ring.

13. The blade and vane assembly of claim 1 wherein the air passages are orientated at an oblique angle relative to the engine centerline.

14. An inner diameter vane seal for a gas turbine engine, the inner diameter vane seal comprising:
    an annular, ring-like body comprising:
    an outer diameter rim extending circumferentially for engaging inner diameter ends of vanes;
    an inner diameter rim extending circumferentially and spaced radially from the outer diameter rim;
    sidewalls connecting the inner diameter rim to the outer diameter rim to define a plurality of angled air passages extending from a forward face to an aft face between the inner and outer diameter rims.

15. The inner diameter vane seal of claim 14 wherein the outer diameter rim includes a plurality of slots extending from the forward face to the aft face.

16. The inner diameter vane seal of claim 15 wherein each slot is positioned over an individual air passage.

17. The inner diameter vane seal of claim 15 wherein the slots and the individual air passages are angled with respect to a central axis of the annular, ring-like body.

18. The inner diameter vane seal of claim 15 wherein each slot includes a seal.

19. The inner diameter vane seal of claim 18 wherein the seal comprises a wire seal.

20. The inner diameter vane seal of claim 14 wherein the outer diameter rim and the inner diameter rim comprise different materials.

21. The inner diameter vane seal of claim 20 wherein the plurality of sidewalls include a split line where the different materials of the outer diameter rim and the inner diameter rim are joined.

22. The inner diameter vane seal of claim 14 wherein the outer diameter rim includes:
    a forward seal slot extending around a circumference of the annular ring-like body; and
    an aft seal slot extending around a circumference of the annular ring-like body.

23. The inner diameter vane seal of claim 14 wherein the inner diameter rim includes forward and aft hooks for engaging the forward and aft rotors.

24. The inner diameter vane seal of claim 14 wherein the outer diameter rim includes an abradable material located at an outer diameter surface.

25. The inner diameter vane seal of claim 14 wherein the air passages are orientated at an oblique angle relative to an engine centerline.

* * * * *